Feb. 29, 1944.  W. S. BURKHART  2,343,169
METHOD OF CONCENTRATION
Filed Feb. 12, 1942

INVENTOR
WILLIAM SHEARMAN BURKHART
Elmer L. Gwickel
ATTORNEY

Patented Feb. 29, 1944

2,343,169

UNITED STATES PATENT OFFICE 2,343,169

METHOD OF CONCENTRATION

William Shearman Burkhart, Lockland, Ohio

Application February 12, 1942, Serial No. 430,586

11 Claims. (Cl. 99—205)

The invention relates to concentrated products and the method for concentrating solids contained in liquids, especially aqueous solutions, and more particularly to the concentration, separation and drying of the mineral, enzyme, vitamin or other valuable elements contained in the solids of fruit, herb, grass, cereal or vegetables juices, milk, mineral water, blood, or the like.

The present method utilizes the known fact that all minerals, vitamins, enzymes and other valuable ingredients in an aqueous solution are contained exclusively in the solids thereof as distinguished from the pure liquid elements and teaches the means for economically expressing the solids without damage to or loss of the vitamin, mineral, enzyme or other vital and valuable content thereof.

Known methods and apparatus devised for attempting separation of solids from aqueous solutions employ the common expedient of applied heat and evaporation by vacuum. Others, such as taught in Patent No. 981,860 to Jackson, recognized the damaging effect of applied heat and excessive exposure upon the aroma and vitamin or mineral content of various solutions and evolved a cooling process whereby only the watery portion of a solution was converted to ice and juice run off. The juice, being fluid, necessarily contained a larger percentage of waste water and hence did not approach a true concentrate. It was, therefore, unnecessarily bulky and was not susceptible of being kept indefinitely without the loss of its essential vitamins, aroma and minerals. Jackson also taught that the watery portion, when frozen, contained a high percentage of juices which he sought to recover by placing the ice in a refrigerated centrifugal separator so as to break up, but not melt, the ice to release the juices.

At a later date, one Krause, patentee of Patent No. 2,248,634, recognized the damaging effect of direct heat treatment and the shortcomings of Jackson's teachings because he combined the inefficient freezing of Jackson with a vacuum pressure preheated gas system for slow surface evaporation to remove some of the excessive water from the remaining fluid juices. However, the juices were affected by oxidation and other deteriorating actions and as a result lost much of their vitamin, aroma, and mineral content. Obviously, these known processors utterly failed to fully appreciate the non-commercial and non-dietetical value of their attempted juice concentrate due to the damaging effect, regardless of how applied, of excessive heat, oxidation, exposure to light and other conditions which adversely affected the vitamin, mineral and food values of the juice concentrate. Further, such juices are incapable of convenient and low cost transportation or storage because of their liquid form.

Another objectionable characteristic of these and other known processes is that insufficient dehydration of the juices prior to the attempted final concentration results in excessive costs of operation. Efficient and economical commercial operation of various known dryers, etc., require that there be at least thirty-five percent solids in the treated solution. This high concentrate is impossible of attainment by known methods, inexpensively.

It is, therefore, an object of the invention to provide a novel method and means for processing vitamin, enzyme, or mineral containing solutions inexpensively, which includes the judicious application of negative heat, to effect a very high percentage of solid concentration in granular form.

Another object is to provide a method and means for inexpensively reducing aqueous solutions or other liquids to a form of powder having substantially all the nutritional, vitamin, enzyme or other valuable chemical characteristics of the solution.

Another object is to obtain a high concentrate of solids from an aqueous solution or other liquids by means of a novel process of ice crystallization.

Another object is to provide a novel method and structural organization for producing inexpensively a frozen juice concentrate which will keep indefinitely without adding preservatives.

Another object is to provide a novel method for obtaining a high concentration of valuable solids from an aqueous solution or other liquids inexpensively regardless of the specific gravity of the solids in solution.

The foregoing and such other objects of the invention as will appear hereinafter as the description proceeds, will be more readily understood from a perusal of the following specification, in which reference is had to the accompanying drawing, wherein.

Figure 1:
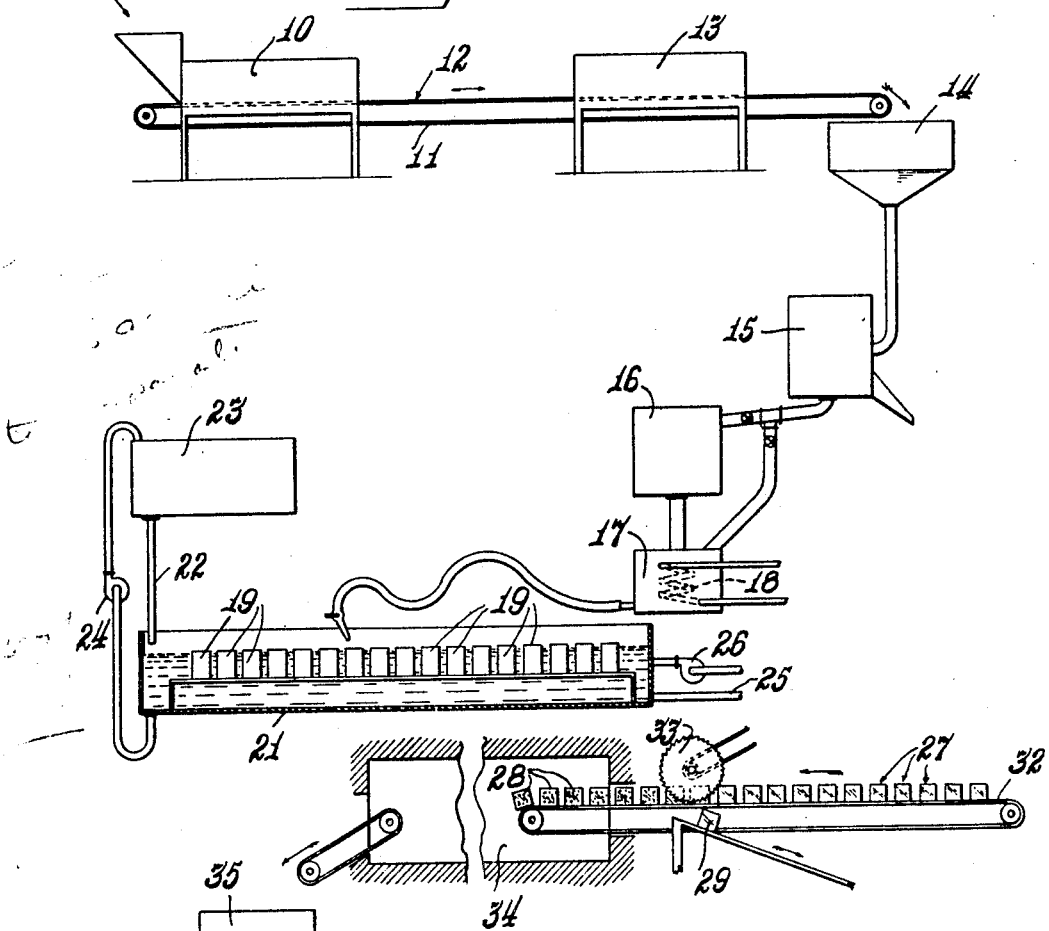
Fig. 1 is a schematic view illustrating an exemplary organization apparatus for carrying out the steps of the invention.

In general, the method of the present invention is concerned with the expression and preservation of the vitamin, enzyme, mineral and other vital content of aqueous solutions and liquids such as, for example, fruit, herb, grass, cereal or vegetable juices, milk, meat extracts, liver, etc. For the purpose of simplicity and description, the juices, extracts, etc., are referred to hereinafter as the "solution." To carry out the steps of the method, certain known types of mechanical equipment are required to be novelly associated whereby the solution, during the processing, is alternately frozen, thawed, and again frozen. The preliminary freezing need not necessarily be solid inasmuch as its purpose is adequately fulfilled if subjected to freezing temperature for a time sufficient to produce ice crystallization only.

As is well known to those familiar with the art, a formation of ice crystals is obtained when a given solution is subjected to below freezing temperatures for a definite period of time. Ice crystals, in their formation, exclude all matter other than water so that if a mass of crystals is separated from the whole, it will be found to contain ice crystals of pure water and such solids as may have been imprisoned in the mass. It is well known also, that vitamin, mineral, enzyme and other ingredients are contained exclusively in the solids of a solution, hence removal of the pure water from a solution concentrates the vitamin, mineral and enzyme content in the remaining solids.

The present disclosure teaches the novel method of breaking down a solution to clearly define the volumes of solids and pure water by freezing the solution sufficiently to create at least ice crystals and then adding only sufficient heat to revert the solution as a whole back to a fluid. The solution then is allowed to rest without agitation to permit any particles of solids initially imprisoned in the ice crystal mass to settle by gravity towards the bottom of the container. After settling, the solution is again subjected to below freezing temperatures so as to create a frozen ice block, which block will have a clearly defined lower end portion composed almost entirely of a concentrate of solids and an upper portion of frozen water. The line of demarkation will be very apparent, for example, where the solution is tomato juice in which event the lower or "solid" portion will be red while the upper or "ice crystal" portion will be clear.

The frozen concentrate of solids is then, by the present method, severed in a suitable manner from the frozen water portion and the latter discarded. The frozen concentrate of solids, which contains substantially all of the vitamin, mineral, enzyme and other vital content of the solution, may be packed in suitable containers, if desired, and stored and preserved, for subsequent use or further processing, for an indefinite period of time if properly refrigerated to prevent thawing. This is because the frozen concentrate of solids is not subject to oxidation since oxidation is largely directly proportional to the temperature of the product.

The frozen concentrate of solids are intended to be processed further by subjecting them, if necessary, to sterilizing and pasteurizing steps so as to remove micro-organisms or other undesirable elements, which elements remained dormant while the concentrate was frozen. Following pasteurization or sterilization, the concentrate is put through a suitable dryer which effects substantial removal of all the remaining moisture so that the resulting output of the dryer is in the form of a powder or flake which may readily be preserved by refrigeration or further process, such as for example, by having drugs, minerals, enzymes, vitamins or other solution powders or combinations of such powders added thereto for packaging or pressing into tablet, lozenge or cube form.

A practical organization for carrying out the method of the invention is illustrated in Fig. 1 of the accompanying drawing. The organization may, for the purpose of convenience, be divided into two distinct phases; the first, the concentrating phase; and the second, the processing phase. In practice, it is most economical to have the concentrating phase situated at the point of origin of the fruit, vegetable or other produce or product to be treated and to establish the processing phase in the consumer area, although it is to be understood that both phases may constitute a single closely integrated organization.

In operation, selected fruits, vegetables or other products are admitted into a suitable washer 10 wherein they are thoroughly cleansed of all foreign substances, spray material and the like. They are then conveyed, preferably by means of an endless belt conveyor 11, to a sorting and cutting table 12 where culls are removed and, if required, the product cut into suitable sizes for juicing. If care is exercised, at this time, to remove all damaged or partially rotted produce, a later described pasteurizing step otherwise required of certain products may be eliminated as unnecessary.

The produce then passes through another washer 13 and finally is deposited in a special juicer apparatus 14. The pulp and juice from the juicer 14 then pass, preferably by gravity, downwardly into a hydraulic press 15, which effectively expresses and separates the pulp from the juice and the juice (solution) is delivered either directly or through a filter press 16 into a storage tank 17 having a cooling unit 18 or the like therein for pre-cooling the solution prior to its being flowed into a plurality of freezing units or ice making cans 19. Maintenance of low storage temperatures is required to prevent oxidation or deterioration of the solution with its resultant loss of vitamin and other valuable content and also to hasten the subsequent formation of ice.

The freezing units 19 may be of any practicable size or shape. Preferably they are relatively deep and wide but relatively thin so as to minimize the freezing effort when a freezing agent is admitted into the tank 21 containing said units.

As illustrated, a predetermined amount of brine or other refrigerant is run into the tank 21 through a line 22 leading from a suitable storage tank 23, and retained long enough to effect freezing, or at least ice crystallization, of the solution. Production requirements necessitate relatively rapid freezing but obviously it should not be so rapid as to prevent an expression of most of the solids during the period of ice crystallization. The expressed solids move downwardly by gravity during the crystallization process so as to effect the desired concentrate of solids at the bottom of the freezing unit 19. As soon as the solution is frozen, or at least after the entire water content of the solution has formed ice crystals, the refrigerant is drawn off, preferably by means of a pump 24 so as to hasten the processing and returned to its storage tank 23 where it is maintained at a low temperature for economy and efficiency. Draining off of refrigerant is immediately followed by flowing a warm non-freezing solution, warm water or the like, through a line 25 into the tank 21 so as to bring about quick thawing of the ice crystals and hasten the processing. When the solution is again fluid, the non-freezing solution is drawn from the tank 21, preferably upon operation of a suitable pump 26, and the now fluid solution is allowed to rest for a predetermined period of time before further processing. It must not be agitated or disturbed. The rest period is required to permit solids which have been imprisoned among the ice crystals to settle by gravity so that a very high percentage of solids is ultimately concentrated at the bottom of each unit 19 as distinguished from a concentration of pure water thereabove. The refrigerant then is again run into the tank 21 to freeze the contents of each unit 19 into a block 27.

Figure 2:
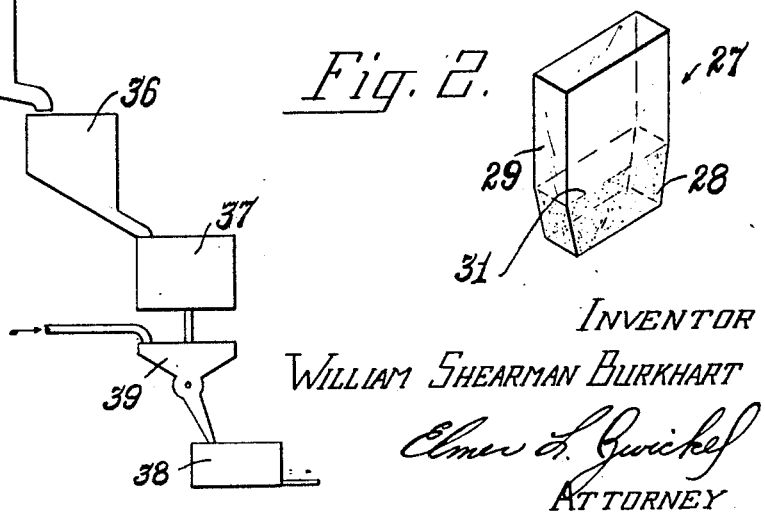
Fig. 2 is a perspective view of an exemplary form of a block of frozen solution.

Experimentation has indicated that initial freezing or crystallization, a single thawing, and a final freezing with a period of rest preceding the final freezing, is sufficient in most instances to result in the desired high concentration of solids at one end of the block 27. However, it should be understood that under certain conditions involving the processing of specific solutions having exceedingly light weight solids, it may be advisable or perhaps necessary to repeat the thawing, settling, and subsequent freezing steps two or more times. In either event, the frozen blocks 27, an exemplary form of which is illustrated in Fig. 2, each consist of a portion 28 having a concentrate of solids and an ice crystal portion 29, with a demarkation line at 31. The demarkation line is clearly visible in instances where the concentrate is a distinct color, as for example when such products as grapes, tomatoes, grass or cereal plants or the like are processed. When the concentration is white, such as results from processing cane sugar, mineral water or the like the demarkation line may be difficult to see. In that event, the specific units 19 may be particularly shaped to produce a frozen block having a clearly distinguishable portion of solid concentrate. For example, the unit 19 may have its lower side walls tapered inwardly only for a distance equal to the established depth of a particular concentrate, or it may be otherwise marked to impart an easily distinguishable marking on the resulting block, such as for example, the block 27 of Fig. 2.

Immediately following removal of the blocks 27 from units 19, they are placed upon one of their edges on a conveyor 32 which carries them into the path of a severing unit 33 which is illustrated as a power operated circular saw. The saw 33 is, of course, positioned with relation to the moving blocks so as to sever each block at the line of demarkation 31. Inasmuch as the line of demarkation in the blocks may vary in accordance with the "solid" content of various solutions, the saw or other severing means necessarily is mounted for adjustment. Of course all blocks of a specific solution will have a uniform demarkation. The severed ice crystal portion 29 is conveyed away from the machine and may be disposed of in any practical manner. The remaining block portion, or frozen concentrate of solids 28, is conveyed, by the belt 32, into a suitable storage room 34 having a temperature considerably below freezing so as to maintain the concentrate of solids frozen.

It should be apparent at this time that the frozen concentrate of solids 28 is substantially devoid of all water content and is composed essentially of the solid or mineral, vitamin and other valuable contents of the original solution and that, as such, may be stored for future use under refrigeration in a minimum amount of space and easily transported in refrigerated carriers to any selected consumer area for immediate use or for continued refrigeration pending further processing. Obviously, the frozen concentrate of solids may be used without further processing. For example, upon reaching a destination, they may be returned to liquid form and sufficient water added to restore a volume having substantially all of the dietetical characteristics of the original filtered solution.

As previously pointed out, the frozen concentrate may be further processed to reduce it to a powder or tablet having a high concentrate of vitamin, mineral or other food content. These further steps involve the delivery of the frozen concentrate from their place of storage preferably into a melting and sterilizing vat 35. The melting vat is required only in instances where it is advisable to sterilize or pasteurize the concentrate to remove any micro-organism which might have been present in the original solution but which remained dormant under refrigeration.

It has been established that if the frozen concentrate is exposed in the melting vat 35 to a temperature of plus 140° F. for 30 minutes, the original vitamin and food value is not damaged. The sterilized or pasteurized concentrate, or unsterilized melted concentrate, as the case may be, is delivered to a suitable dryer 36 which, if of the spray type, will not require more than one minute to reduce the concentrated juice to a granular form. Although the dryer 36 is illustrated generally, it should be understood that any conventional spray dryer may be used which will reduce the concentrate to a fine granular powder, or that a vacuum drum dryer or vacuum shelf dryer may be employed, in which instance the concentrate will be reduced to fine flakes. Either the powder or the flakes may be packaged immediately for consumption or placed in refrigerated storage (37) for later packaging. If desired, the powder or flakes may be conveyed directly to a conventional tableting machine 38 and be reduced to tablet form either coated or uncoated, or to lozenge form and subsequently packaged.

An alternate method of processing and preparing the powder or flake for ethical or consumer use may involve the addition of drugs, vitamins, minerals, etc., apart from those already contained therein for producing, either in powder or tablet form, a product having a special dietetically characteristic. Accordingly, a product having certain combinations of concentrate powders for specific requirements may be produced. In that event, the concentrate powders and such substances as may be added will pass through a mixing apparatus 39 prior to reaching the packaging or tableting machine 38.

A characteristic of the instant method is that the transformation from the fluid solution to frozen block form and from frozen to powder form is so rapid that damage from oxidation is negligible. This is particularly true in the spray drying process which results in almost instantaneous transformation of the solution to a powder primarily because of its low water content.

It should be understood that the accompanying drawing constitutes but a schematic illustration of the various mechanisms employed in processing and that the various functions, operations and timing may be controlled entirely automatically by use of thermostatic switches and other well known automatic control organizations. Although certain solutions are specifically mentioned herein as suitable for treatment by the described method, it should also be understood that any liquid containing solids may be processed, such as for example, mineral water, whereby the mineral bearing solids are effectively and efficiently removed from the water content. This is evident because, as noted hereinbefore, ice crystals, in their formation, necessarily exclude all solids and the liquid resulting from thawing the pure ice crystals is pure water devoid of solid content. Accordingly, the resulting concentrate, when reduced to granular form, may be inexpensively transported to a bottling plant where water is again added to provide a mineral water having the same chemical potency as the original mineral water before processing.

One of the vital characteristics and aims of the present method is that it affords inexpensive means of obtaining and preserving huge supplies of a vitamin, mineral, enzyme and other vital element bearing concentrate at growing seasons and in producing areas. The practicability of storing a refrigerated concentrate of solids, devoid of waste, for indefinite period without damaging the vitamin content and the small volume of transportation space required to carry the concentrate to the consumer area is also of extreme importance. Further, it is possible by the present method to mix in any combination of available vegetables, fruits, herbs, etc. In fact, a concentrate product may be produced in tablet form dietetically correct in vitamin and mineral content, which vitamins and minerals, when recovered from natural sources, are superior to those produced in laboratories. For example, powdered concentrates obtained from selected solutions can be mixed effectively with a powdered concentrate derived from goat milk and the whole may be reduced to tablet form for specific nutritional indication. As another example of the uses of the present method, large quantities of various types of blood can be concentrated quickly and economically and stored indefinitely, or transported, as a frozen concentrate or in granular form.

Additional illustration of specific uses of the herein disclosed method of solid concentration and the product resulting, as hereinafter set forth, are exemplary only and not intended to be all inclusive.

As is well understood, grape juice contains an active enzyme which has the particular property of destroying fatty tissue and consequently is extensively used by those desiring to lose excess weight. The present method of concentration in granular form preserves all of the active enzyme thus making it practical and economical to produce inexpensive lozenges of grape concentrate.

Further, the processing of sugar cane or beet juice by the instant method provides a means for concentrating all of the vitamin, mineral or any other valuable dietetical substance that may be contained therein in the resulting granular product. Another substance deserving of mention is liver and particularly shark liver from which a valuable liver extract is obtained. This extract which normally deteriorates rapidly may be subjected readily to the herein disclosed process so as to produce a high concentrate of liver extract in a granular form which may be easily and inexpensively preserved.

It should be evident that the instant method of concentration and processing, of which a few specific examples are given, is vastly superior to any known method primarily because of the efficient and effective manner in which solids normally imprisoned in ice crystals are recovered quickly and at low cost. The method further affords low cost storage and transportation due to the relatively small volume of a given heretofore unavailable concentrate as compared with known fluid concentrates or frozen solutions and since applicant's concentrate in its final form is devoid of all moisture, it is not readily subjected to the deteriorating and vitamin destroying action of minor temperature and atmospheric changes.

I claim:

1. The method of obtaining a high concentrate of solids from an aqueous or other liquid solution which includes the successive steps of lowering the temperature of the solution to produce a substantially solid mass, raising the temperature of the mass to restore its aqueousity, lowering the temperature of the solution to solidify it into a body having a clearly defined frozen concentrate of solids and an ice crystal portion, cutting the frozen concentrate of solids from the ice crystal portion, and then melting, sterilizing and finally drying the remaining solids.

2. The method of obtaining a high concentrate of solids from a liquid solution which includes the successive steps of lowering the temperature of the solution to produce a substantially solid mass, raising the temperature of the mass to restore it to a liquid, lowering the temperature of the solution to solidify it into a body having a clearly defined frozen concentrate of solids and an ice crystal portion, cutting the frozen concentrate of solids from the ice crystal portion, and finally drying the remaining solids.

3. The method of obtaining a high concentrate of solids from an aqueous solution which includes the successive steps of lowering the temperature of the solution to produce a substantially solid mass, raising the temperature of the mass to restore its aqueousity, lowering the temperature of the solution to solidify it into a body having as a clearly defined portion a frozen concentrate of solids, and finally cutting the concentrate of solids from the body.

4. The method of concentrating solids contained in an aqueous solution which consists in subjecting the solution to the successive steps of refrigerating, thawing and then freezing to effect a high concentration of solids in a definitely ascertainable portion of the ice block thus formed, cutting said concentrate portion from the ice block, and finally thawing said concentrate portion to permit further processing to remove any remaining moisture.

5. The method of concentrating solids contained in a liquid solution which consists in subjecting the solution to the successive steps of freezing, thawing and again freezing to effect a high concentration of solids in a definitely ascertainable portion of the ice block thus formed, cutting said concentrate portion from the ice block, and finally reducing said concentrate portion to a dry granular substance.

6. The method of concentrating solids contained in a solution which comprises subjecting the solution to below freezing temperatures to reduce the water content thereof to ice crystals, subjecting said solution to above freezing temperatures to destroy the ice crystals, allowing said solution to remain undisturbed for a sufficient period of time to permit gravitational concentration of any solids imprisoned in the ice crystal mass, again subjecting said solution to below freezing temperatures for a time sufficient to produce a frozen solid having a clearly defined ice crystal portion and a frozen concentrate of solids, cutting said frozen ice crystal portion from the frozen concentrate, and finally reducing the frozen concentrate of solids to a dry substance.

7. The method of concentrating solids contained in a water solution which comprises subjecting the solution to below freezing temperatures to produce at least crystallization of the water portion thereof, subjecting said solution to above freezing temperatures to destroy the ice crystals, allowing said solution to remain undisturbed for a sufficient period of time to facilitate gravitational concentration of solids imprisoned in the ice crystal mass, again subjecting said solution to below freezing temperatures for a time sufficient to produce a frozen solid having an ice crystal portion and a concentrate of solids, and finally cutting said ice crystal portion from the concentrate of solids.

8. The method of concentrating solids contained in a solution which consists in subjecting the solution to a temperature sufficiently low to create at least ice crystals, thawing the solution to free solids imprisoned among ice crystals, allowing said solids to settle by gravity, then subjecting the solution to a below freezing temperature to freeze solid at least the resulting concentrate of solids, and finally cutting the frozen concentrate of solids from the non-concentrate portion of the solution.

9. The method of concentrating solids in a solution which consists in subjecting the solution to a temperature sufficiently low to create at least ice crystals, thawing the solution to free solids imprisoned among ice crystals, allowing said solids to settle by gravity, then subjecting the solution to a below freezing temperature to freeze solid at least the resulting concentrate of solids, cutting the frozen concentrate of solids from the non-concentrate portion of the solution, and finally reducing the frozen concentrate of solids to a dry granular substance.

10. The method of concentrating solids contained in a solution which includes the step of reducing the solution to a frozen mass having a clearly distinguishable ice crystal portion and a portion composed almost entirely of solids expressed from said ice crystal portion, and finally cutting said frozen mass to define a separate ice crystal portion and a separate concentrate of frozen solids.

11. The method of concentrating solids contained in a solution which includes the step of reducing the solution to a frozen mass having an ice crystal portion and a portion composed almost entirely of solids expressed from said ice crystal portion, and finally cutting said frozen concentrate of solids from the ice crystal portion.

WILLIAM SHEARMAN BURKHART.